June 11, 1957 B. J. SMITH ET AL 2,795,456
CONVERTIBLE TOP AND HINGED FINISH MOLDING THEREFOR
Filed Dec. 23, 1953 3 Sheets-Sheet 1
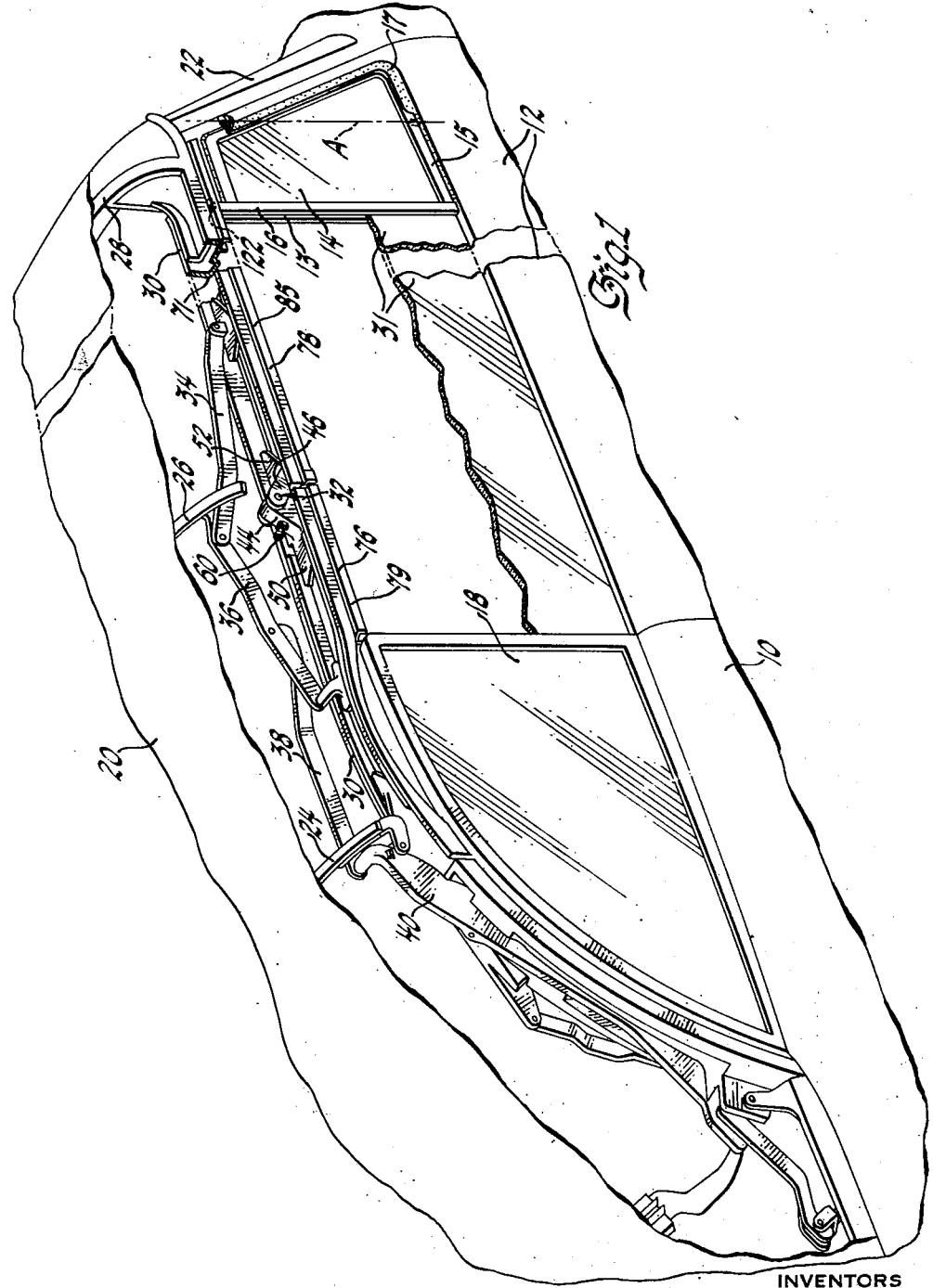
INVENTORS
Ben J. Smith, &
BY Francis E. Smith
ATTORNEY June 11, 1957  B. J. SMITH ET AL  2,795,456
CONVERTIBLE TOP AND HINGED FINISH MOLDING THEREFOR
Filed Dec. 23, 1953  3 Sheets-Sheet 2
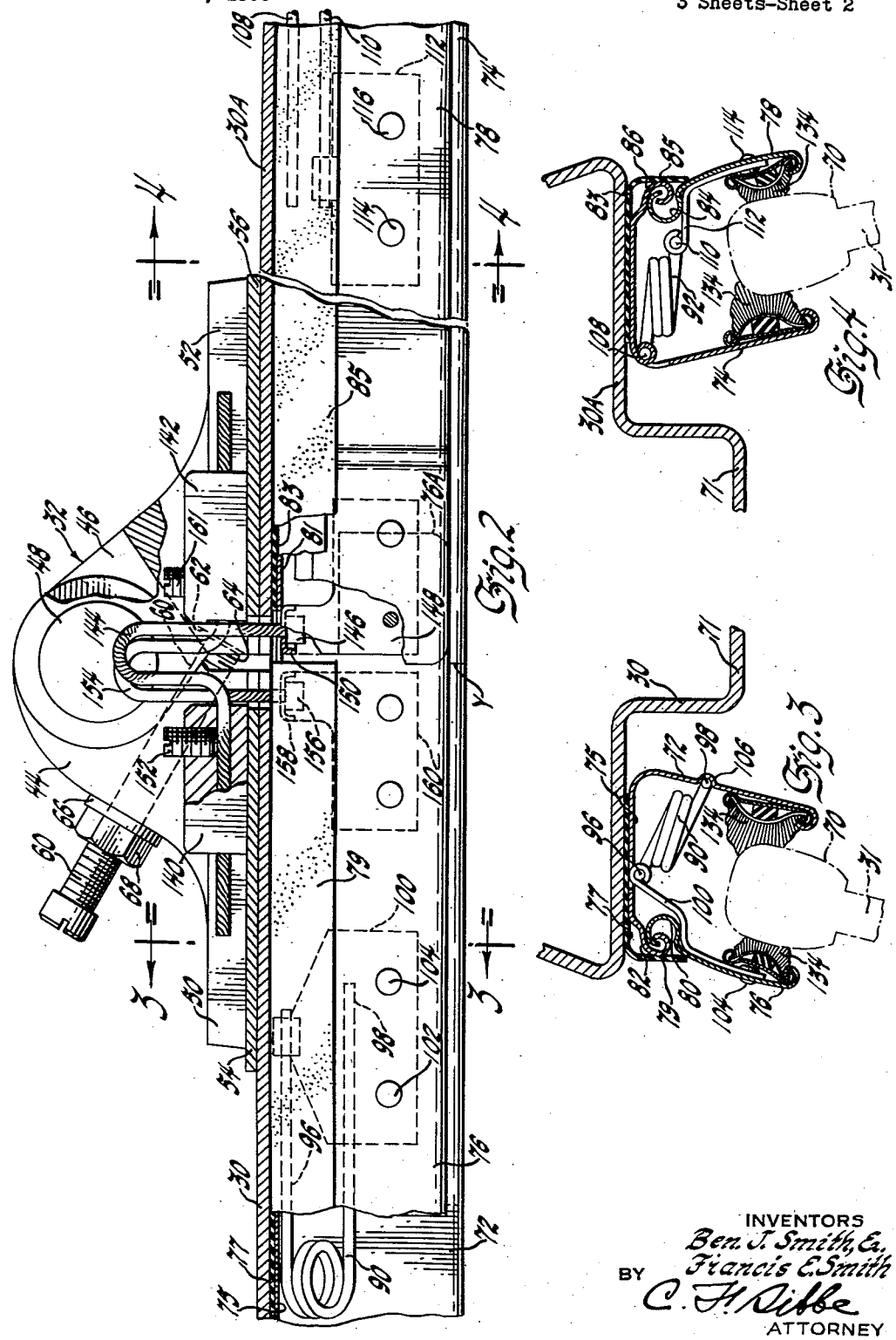
INVENTORS
Ben J. Smith, &
Francis E. Smith
BY
C. F. Dibble
ATTORNEY

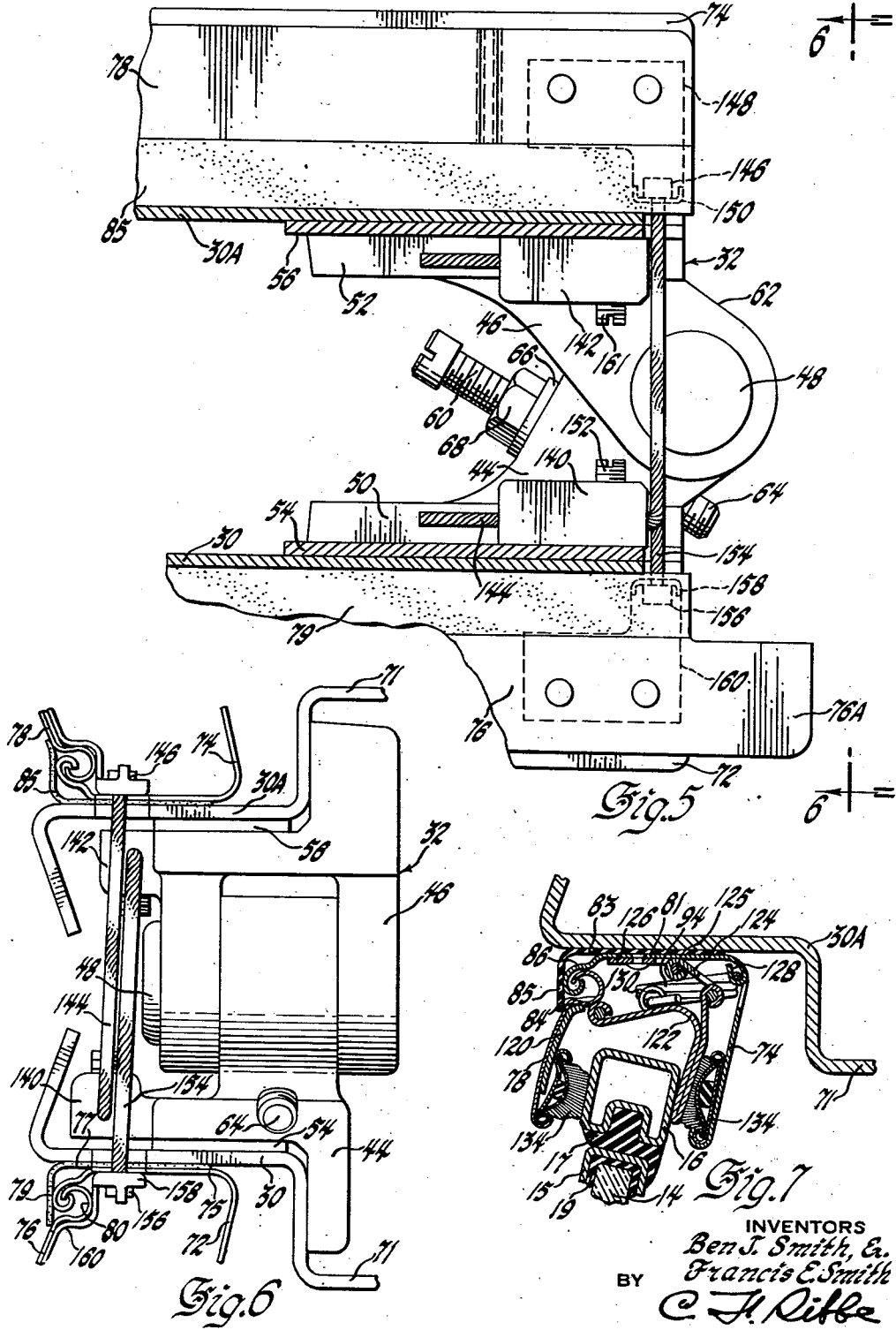

United States Patent Office 2,795,456
Patented June 11, 1957

2,795,456
CONVERTIBLE TOP AND HINGED FINISH MOLDING THEREFOR

Ben J. Smith and Francis E. Smith, Detroit, Mich., assignors to General Motors Corporation, Detroit, Mich., a corporation of Delaware Application December 23, 1953, Serial No. 399,941

7 Claims. (Cl. 296—44.5)

This invention relates to convertible tops and hinged finish moldings for vehicles and more particularly to means applied, or adapted to be applied, to convertible tops for finishing and weather-sealing the elongated depressions or apertures necessarily existent between the tops of vertically opening windows on doors and the horizontal door headers of convertible automobile bodies.

In vehicle bodies of the "hard top" type, difficulties have been encountered in finishing and suitably sealing the body against weather. This difficulty was pronounced at the line of engagement between the top of the vertically opening door window and the door header. In such cases, the door carries no window header to receive the vertically movable door window and the door header must serve in that capacity when the door is closed. The problems with regard to "hard top" bodies have been solved advantageously by the development disclosed in the United States Letters Patent No. 2,631,887, granted March 17, 1953 in the name of James H. Wernig.

With regard to automobile bodies of the convertible type, the same problems present themselves with added complications due to the foldable nature of the car top. The finish molding disclosed in the above-mentioned patent cannot be used on a convertible type vehicle body as parts of the molding would extend outwardly or horizontally immediately upon separation of the car top from the windshield frame during lowering of the top. These extensions or protruding parts of the molding would interfere with or strike other parts of the car or top, either during lowering or raising of the top. Another difficulty arose in attempting to apply the invention of the above-mentioned patent to convertibles in that the frame of the car top is preferably articulated or hinged at a point intermediate the width of the door window, thereby necessitating a substantial change of structure in the finish molding to make it operative.

It is an object of the present invention to provide a convertible top having a finish molding associated therewith which will constitute a seal with relation to the top of a door window and which will not protrude to interfere with the raising or lowering and stowage of the top.

Another object of the invention is to provide a hinged molding to be carried by the door header of a convertible automobile body.

A further object of the invention is to provide a hinged finish molding including a weather stripping forming a channel at the door header of a convertible automobile for receiving the vertically sliding door window when being closed thereby to weather-seal the top of the door window with respect to the frame of the top.

A feature of the invention resides in a convertible top having a hinged frame with a hinged finish molding attached thereto and associated with means for holding the finish molding in an upwardly extending plane during lowering of the top.

Another feature of the invention pertains to a hinged finish molding which is mountable on the hinged frame of a convertible top and operative to seal the top of a door window to the door header which is part of the top frame.

These and other important features of the invention will now be described in detail in the specification and then pointed out more particularly in the appended claims.

In the drawings:

Fig. 1 is a perspective view of one side of a convertible car top in its raised position, but parts being broken away for clarity of illustration;

Fig. 2 is a sectional view drawn to a larger scale, of a hinged portion of the top frame shown in Fig. 1;

Fig. 3 is a sectional view taken along the line 3—3 of Fig. 2 looking towards the rear of the car;

Fig. 4 is a sectional view taken along the line 4—4 of Fig. 2 looking towards the front of the car;

Fig. 5 is a sectional view of the main portion of the structure shown in Fig. 2 but with the parts in their relative positions as assumed during the top-down condition of the vehicle;

Fig. 6 is an end view looking in the direction of the arrows 6—6 in Fig. 5; and

Fig. 7 is a sectional view similar to Fig. 3 looking towards the rear of the vehicle but taken at a point further forward and over a controlled ventilation window.

Only one side of the convertible top with its hinged finish molding is illustrated as an embodiment of the invention as opposite sides of the top frame are similarly constructed although made to the opposite hand.

With reference to the drawings, one side portion of a convertible top type automobile body 10 is disclosed having a door 12 hinged thereto at the front thereof. The door 12 is provided with a controlled ventilation or no-draft window 14 pivotally mounted on a fixed frame 16 (Figs. 1 and 7) the top rear corner of which terminates in a conventional manner above and slightly to the rear of the window 14. The top of this frame 16 constitutes an element fixed to the door 12 to move therewith and which, when the door 12 is closed, causes operation of the sealing strip or hinged finish molding in which the present invention is embodied. The rear and vertical edge of the frame 16 is grooved as at 13 to receive the forward edge of a vertically slidable window glass 31. The window 14 is hinged to pivot on the axis A and is provided with a metal edging 15 along its top, front and bottom. Sealing material 17 and 19 (Fig. 7) is employed with respect to the window 14 and frame 16.

A rear window 18 is provided and a foldable top 20 is supported in a conventional manner such as to be adapted to be raised and tightly engaged as a seal against the weather with the top edge of the window 18 and to be secured by releasable connections not shown to the top member of the frame for the windshield 22. The top 20 is of fabric and is provided with cross braces 24, 26 and 28, and a side member 30 of the top frame is articulated or hinged at a connection 32, whereby the top 20 by virtue of the linkages 34, 36, 38, 40 and others may be folded and stowed in a compartment to the rear of the window 18. This top brace linkage may be modified and the present invention is not limited to use with the specific type shown. An example of such a linkage is disclosed in the United States Letters Patent No. 2,498,868 granted February 28, 1950, in the name of T. Vigmostad.

The side member 30 of the top frame is divided into two portions at a point intermediate the width of a main window 31 (Figs. 3 and 4) in the door 12 and includes a forward portion 30A which may be folded back by means of the hinge connection 32.

The hinge connection 32 constitutes a rearwardly disposed bracket 44 and a forward bracket 46 pivoted together by means of a pin 48. The brackets 44 and 46 are provided with flanges 50 and 52 respectively. Interposed between the flange 50 and the top portion of the side member 30 is a stiffening plate 54. A similar plate 56 is interposed between the forward portion 30A of the frame member 30 and the flange 52.

The bracket 44 is made with a forwardly and downwardly inclined threaded bore arranged to receive a bolt 60. As seen in Fig. 2, a rearward face 62 of the bracket 46 is made to contact the end 64 of the bolt 60, and this constitutes a stop for maintaining the top frame parts in proper horizontal alignment with each other when the top 20 is raised. A washer 66 and nut 68 are provided on the bolt 60 whereby proper adjustment of the latter may be secured or maintained.

The main window or vertically slidable window 31 in the door 12 is shown in Fig. 1 and a portion thereof is shown by dot-and-dash lines in Figs. 3 and 4. The top and rear edges of the window 31 are provided with an ornamental and protective metal trim strip 70 which is conventional.

The side member 30 of the top frame, including its forward portion 30A, is a two-piece door header with which the window 31 must be adapted to become associated in sealed engagement when the top 20 is raised. It will be noted that the side member or door header 30 in the particular embodiment illustrated is made with a depressed portion 71 running longitudinally thereof.

Attached to the door header 30 and spaced outwardly from the depressed portion 71 are arranged two depending strips 72 and 74 adjacent ends of which are adapted to abut at Y (Fig. 2) when the top 20 is raised. The strip 72 is provided with a horizontal flange 75 which is attached to the frame member 30 with a flexible or resilient member 77 interposed. The member 77 has a flexible and depending flange 79 (Fig. 3) adapted to act as an exterior sealing device as will further appear. The ends of the strips 72 and 74 may be arranged to overlap slightly for an increased sealing effect when the top 20 is raised but those strips may be eliminated entirely if desired.

The strip 74 is provided with a horizontal flange 81 which is fixed to the door header portion 30A with a flexible sealing member 83 interposed. The member 83 has a depending flexible flange 85 which functions in a manner similar to that of flange 79.

Also depending from the door header 30 and spaced outwardly from the strips 72 and 74 are two swingable and overlapping strips 76 and 78. The strip 76 is attached to the depending strip 72 by complementary hinge rolls 80 and 82 and the strip 78 is pivoted to the depending strip 74 by means of complementary hinge rolls 84 and 86.

As in the patent previously referred to, spring elements 90, 92 and 94 are provided as means resiliently urging the swingable strips 76 and 78 outwardly.

A spring element 90 is provided with two end portions 96 and 98 and the end portion 96 is pivoted in one end of a looped clip 100 which is riveted at 102 and 104 to the swingable strip 76 and the other end 98 of the spring 90 is resiliently held within a depression 106 (Fig. 3) formed in the depending strip 72.

The spring 92 has one end 108 pivoted to the upper portion of the depending strip 74 and the other end 110 is journaled in a looped clip 112 which in turn is riveted at 114 and 116 to the swingable strip 78.

The forwardly supported portion of the swingable strip 78 is provided with a looped clip 120 (Fig. 7) to which one leg of a V-shaped contact element 122 is pivoted. The other leg of the element 122 is so arranged as to be contactable by an element fixed on the door 12 to move therewith. In the present instance, this element constitutes the controlled ventilation window frame 16 but it may be any element fixed to the door and properly located.

The V-shaped element 122 is arranged to pivot with respect to the door header portion 30A through the medium of a link 124 which in turn is pivoted at 125 to a member 126 riveted to the horizontal flange 81. The spring 94 has one leg held in a loop 128 and the other leg is attached by means of a loop 130 to one leg of the contactable element 122.

The arrangement of the parts is such that the springs 90, 92 and 94 serve resiliently and constantly to urge the swingable strips 76 and 78 outwardly. In the present instance, however and as previously stated, the two longitudinally aligned and swingable strips are not joined as an integral unit. The arrangement is such that contact of the control ventilation window frame 16 with a depending leg of the V-shaped element 122 as the door 12 is closed causes the forward end of the swingable strip 78 to approach a vertical plane and come in sealing relation with the frame 16. Simultaneous with this action and as the door is being closed, the outward thrust of the spring 92 is overcome by the action of the V-shaped element 122 and the same action occurs with respect to the spring 90. The over-center positions of the springs 90, 92 and 94 are such that the swingable strips 76 and 78 twist slightly as they assume their sealing positions— i. e.—positions approaching a vertical plane. When the door 12 is fully closed the swingable strips 76 and 78 will be in their fully closed or sealing positions against the trim strip 70 of the window 31 in the event the window 31 is in its raised position. If the window 31 is lowered during closing of the door 12, then the strips 76 and 78 are positioned with relation to the depending strips 72 and 74 to form a channel receptive to the trim strip 70 of the window 31 when the latter is subsequently raised.

Weather strip elements 134 of a suitable type are secured to the depending strips 72 and 74 as well as to the two swingable strips 76 and 78 for actual sealing engagement with the window trim strip 70 and the fixed frame element 16 of the controlled ventilation window 14.

Integral with the two hinge brackets 44 and 46 are two side lugs 140 and 142 respectively. The lug 140 is drilled slidably to receive one end of a flexible cable 144. The cable 144 extends through the lug 140 and the opposite end of the cable is provided with a stop head 146. The swingable strip 78 has riveted to it a small plate 148 which is provided with a flange 150 through which the cable 144 extends and against which the stop head 146 is adapted to abut. A set screw 152 is threaded into the lug 140 and the end thereof is adapted to engage the cable 144 to secure longitudinal adjustment of the latter.

A second cable 154 is arranged similarly to the cable 144 but in this case the cable is provided with a stop head 156 abutting a flange 158 of a plate 160 riveted to the swingable strip 76 and the other end of the cable 154 is passed through the lug 142 and held in position by means of a set screw 161.

As best seen in Fig. 5, the parts are so notched and proportioned that the cables 144 and 154 are taut and located just to the rear of the center line of the pivot pin 48 when the portion 30A is swung back.

It will be noted that the swingable strip 78, at its rearmost portion, overlaps the forward end 76A of the swingable strip 76 when the top is in its raised position. Because of this relation and despite substitution of two swingable strips for one, the action of the fixed element 16 with respect to the V-shaped element 122 is adequate to cause the two sections or two swingable strips to swing downwardly and together and with a twist as the door 12 is closed. Upon opening of the door, springs 90, 92 and 94 cause the strips 76 and 78 to swing towards a horizontal plane to clear the outward path of the window 31.

When the top 20 is to be lowered and the frame member 30 is raised slightly after being disconnected from the windshield frame, the lever 122 loses contact with the fixed element 16 with the result that the springs 90, 92 and 94 are again effective to swing or turn the swingable strips 76 and 78 outwardly or towards a horizontal plane. During subsequent lowering or raising of the top 20, the swingable strips must not be in their outward positions as they would strike other portions of the car or top as stated heretofore.

Accordingly, when the door header portion 30A is moved upwardly and before obstructions are encountered, it is necessary that the swingable strips be moved or turned widthwise towards a vertical plane and this is brought about by the cables 144 and 154 which operates as lost motion connection or stop means. Cables 144 and 154 are so arranged, with relation to the pivot pin 48, that when the door header portion 30A is rotated on the pivot pin 48 through an angle of approximately 180 degrees with respect to the remaining portion of the side member 30, the cables are made taut as in Fig. 5. Action of the cables thereby pulls or turns the swingable strips 76 and 78 towards a vertical plane so that they clear the obstructions which would otherwise interfere with stowage of the top.

A preferred embodiment has been shown in that two cables 144 and 154 are used with respect to each side member 30 of the top frame. It will be appreciated that a single cable may be used to perform the same function as carried out by the two cables although such an expedient would involve a more critical adjustment. Nevertheless, one cable or one lost motion connection may be substituted for the two cables or two lost motion connections without departing from the spirit of the present invention.

Specific details regarding the arrangement and function of the springs 90, 92 and 94 are more fully explained in the Patent No. 2,631,887 referred to earlier in this specification.

Having described our invention, what we claim as new and desire to secure by Letters Patent of the United States is:

1. A hinged finish molding for convertible automobile door headers for use above a vertically opening window in a door employing no window header but having a fixed door element, said molding comprising a depending strip mountable on a hinged two-portion door header of a convertible top, a swingable strip adapted hingedly to depend from the two portions of said door header and to be spaced outwardly from said depending strip, means on said header urging said swingable strip towards a horizontal plane, means associated with said swingable strip and contactable by an element fixed to the door when said door is closed to swing said swingable strip toward a vertical plane, and actuating means on said door header arranged to be operable by relative motion of said two portions of said door header and effective on said swingable strip to urge the latter towards said vertical plane when one of said portions is raised for lowering of the top.

2. A hinged finish molding for convertible automobile door headers for use above a vertically opening window in a door having a fixed door element, said molding comprising two depending strips mountable on the hinged portions of a door header for a convertible top, two swingable and overlapping strips adapted hingedly to depend from said door header and to be spaced outwardly from said depending strips, means urging said swingable strips towards a horizontal plane, means associated with said swingable strips and contactable by an element fixed to the door when said door is closed to swing said swingable strips toward a vertical plane, and means associated with said portions and connected to said swingable strips to pivot the latter towards said vertical plane when said portions are raised and moved relatively for lowering of the top.

3. A hinged finish molding for convertible automobile door headers for use above a vertically opening window in a door employing a fixed door element, said molding comprising two swingable strips adapted hingedly to depend from a door header on a convertible top with said header comprising two portions connected by hinge means, means resiliently urging said swingable strips towards a horizontal plane, means associated with said swingable strips and contactable by an element fixed to the door when said door is closed to swing said swingable strips toward a vertical plane, and actuating means employing cables mountable on said door header in association with said hinge means and connected to said swingable strips to urge the latter towards said vertical plane when said portions are moved relatively for lowering of the top.

4. A convertible top having a frame with a door header, said header having two portions, a finish molding hinged to said header, said molding comprising a swingable strip hinged to said door header, spring means urging said swingable strip to turn outwardly and widthwise, means associated with said strip and contactable by an element fixed to the door when said door is closed to hold said strip in a downwardly swung position against said spring means, and means on said two portions and connected to said strip to turn the latter with reference to its length and inwardly against said spring means when said portions are moved relatively and toward their lowered top positions.

5. A convertible top having a frame with a door header, said header having two portions hinged together, a finish molding hinged to and along one portion of said header comprising a swingable strip, a lost motion device associated with each of said door header portions, and said device being operable to turn said strip inwardly and with reference to its length when said door header is folded on its hinge.

6. A convertible top having a frame with two separate portions on each side, a hinge connecting said portions in lengthwise alignment when said frame is in raised top position, a finish molding strip extending along one of said two portions and hinged for widthwise turning with relation thereto, a lost motion device connecting the other of said two portions with said strip, the arrangement being such that angular motion of one of said portions toward the other about said hinge activates said device to turn said strip with reference to its length into a substantially vertical plane.

7. A hinged finish molding for convertible tops comprising a swingable strip mountable in hinged relation upon a hinged two-portion door header, means urging said swingable strip to lie in a horizontal plane, means associated with said strip and contactable by an element fixed to the door when said door is closed to hold said strip in an upwardly extending plane, and means employing a lost motion connection associable with the said door header at its hinge and connected to said strip to pivot the latter away from said horizontal plane when one of said portions of said door header is moved away from the raised top position.

References Cited in the file of this patent

UNITED STATES PATENTS

| | | |
|---|---|---|
| 2,606,060 | Mechlin | Aug. 5, 1952 |
| 2,631,887 | Wernig | Mar. 17, 1953 |